US008501078B2

(12) United States Patent
Meinzinger (10) Patent No.: US 8,501,078 B2
(45) Date of Patent: Aug. 6, 2013

(54) METHOD AND DEVICE FOR BLOW MOLDING CONTAINERS

(75) Inventor: Rupert Meinzinger, Kirchroth (DE)

(73) Assignee: Krones AG, Neutraubling (DE)

( * ) Notice: Subject to any disclaimer, the term of this patent is extended or adjusted under 35 U.S.C. 154(b) by 338 days.

(21) Appl. No.: 12/872,023

(22) Filed: Aug. 31, 2010

(65) Prior Publication Data

US 2011/0057362 A1  Mar. 10, 2011

(30) Foreign Application Priority Data

Sep. 8, 2009 (DE) .......... 10 2009 040 559

(51) Int. Cl.
*B29C 35/02* (2006.01)
*B29C 43/02* (2006.01)
*B29C 49/00* (2006.01)

(52) U.S. Cl.
USPC .......... 264/521; 264/40.1; 264/346; 264/500; 264/519; 264/520; 264/523; 264/535; 264/572; 264/573

(58) Field of Classification Search
USPC ................ 264/521, 538, 543, 40.1, 346, 500, 264/519, 520, 523, 535, 572, 573; 425/143, 425/150, 522, 526, 534
See application file for complete search history.

(56) References Cited

U.S. PATENT DOCUMENTS

| 3,892,830 | A | * | 7/1975 | Hudson et al. ................. 264/520 |
| 3,950,459 | A | * | 4/1976 | Seefluth ......................... 264/521 |
| 4,035,463 | A | * | 7/1977 | Rosenkranz et al. ......... 264/521 |
| 5,853,775 | A | * | 12/1998 | Oas et al. ....................... 425/145 |
| 6,109,907 | A | * | 8/2000 | Takada et al. ................. 425/526 |
| 6,113,840 | A | * | 9/2000 | Emmer et al. ................. 264/521 |
| 6,287,507 | B1 | * | 9/2001 | Appel et al. ................... 264/521 |
| 6,368,099 | B1 | * | 4/2002 | Kresak et al. ................. 425/526 |
| 6,514,448 | B1 | * | 2/2003 | Vogel et al. .................... 264/346 |
| 6,554,602 | B2 | * | 4/2003 | Deemer et al. ................ 425/525 |
| 6,945,260 | B1 | | 9/2005 | Stocchi et al. |
| 7,491,358 | B2 | * | 2/2009 | Gernhuber et al. ........... 264/454 |
| 8,231,823 | B2 | * | 7/2012 | Humele et al. ................ 264/489 |
| 2008/0217326 | A1 | * | 9/2008 | Armellin et al. .............. 219/659 |
| 2009/0261513 | A1 | * | 10/2009 | Forsthovel et al. ........... 264/410 |

FOREIGN PATENT DOCUMENTS

| DE | 1704119 B1 | 2/1972 |
| DE | 19608570 A1 | 9/1997 |
| EP | 0958124 A1 | 11/1999 |

(Continued)

OTHER PUBLICATIONS

Search Report for DE 10 2009 040 559.3, dated Sep. 5, 2011.

*Primary Examiner* — Christina Johnson
*Assistant Examiner* — Atul P. Khare
(74) *Attorney, Agent, or Firm* — Marshall, Gerstein & Borun LLP (57) ABSTRACT

A method for blow molding containers having cross-sections of a non-circular shape from preforms, in which a temperature profile varying at least in the circumferential direction of the preform is produced by means of at least one heat transfer element, for which purpose the preform and at least the heat transfer element are oriented toward one another by a relative rotational movement in the circumferential direction of the preform, the heat transfer element is rotated relative to the stationary preform about a heat transfer element axis during the relative rotational movement. Further, a device for blow molding such containers where the heat transfer element and the holder are rotatable about a heat transfer element axis and are coupled with a rotational drive.

8 Claims, 5 Drawing Sheets

FOREIGN PATENT DOCUMENTS

| | | |
|---|---|---|
| EP | 1279477 A1 | 1/2003 |
| JP | 60040227 A * | 3/1985 |
| WO | WO-0181069 A1 | 11/2001 |
| WO | WO 2007131701 A2 * | 11/2007 |

* cited by examiner

METHOD AND DEVICE FOR BLOW MOLDING CONTAINERS

CROSS-REFERENCE TO RELATED APPLICATION

The present application claims the benefit of priority of German Application No. 102009040559.3, filed Sep. 8, 2009. The entire text of the priority application is incorporated herein by reference in its entirety.

FIELD OF THE DISCLOSURE

The disclosure relates to a method and to a device.

BACKGROUND

In the method known from EP 0 958 124 A each preform is rotated stepwise relative to the heat transfer element in order to produce the temperature profile. For instance, the preform is rotated by a rotational drive relative to stationary heaters or a cooling nozzle. The temperature profile is produced either by uniformly tempering the preform and overlaying it with the temperature profile, or the temperature profile is produced in the cold preform in a step-wise operation. The preform has a mechanically detectable circumferential marking, for instance, a groove in the support ring, so as to allow the adjustment of predetermined rotational positions of the preform or the blow-molded container. As the preform has to be rotated relatively fast and may already be plastically deformable the relative rotation may result in undesired deformations of the preform or in collisions with the heat transfer element, for instance, due to centrifugal forces.

In a method known from EP 1 279 477 A and an apparatus for the blow molding of bottles conceived to perform the method a non-contact sensor is used to detect grooves distributed on the preform in circumferential direction so as to precisely rotate each preform by rotation around the preform axis. In the blow mold the preform is engaged with protrusions provided in the mold by using the circumferential grooves.

In a method for blow molding oval bottles from basically circular cylindrical preforms according to U.S. Pat. No. 3,892,830 each preform is rotationally positioned by a rotatable holder relative to two diametrically opposite heat transfer elements, which are constructed as cooling jaws, before the cooling jaws are placed against portions of the circumferential surface of the preform in order to produce the temperature profile by heat abstraction. The temperature profile varying in the circumferential direction is produced to obtain a specific material distribution in the wall of the bottle during the blow molding of the non-circular contour shape of the circular cylindrical preform.

SUMMARY OF THE DISCLOSURE

The disclosure is based on one aspect of providing a method and a device of the above-mentioned type, which allow the blow molding of containers having a non-circular contour from substantially circular cylindrical preforms continuously and at a high production rate, along with reduced efforts in terms of construction and process engineering.

Contrary to the known principles the method is realized not by rotating the preform relative to the heat transfer element in order to produce the temperature profile and/or carry out a correct positioning for the blow molding or stretch blow molding process, but by rotating the heat transfer element relative to the stationary preform about a heat transfer element axis so as to generate the necessary relative rotational movement between the heat transfer element and the preform until the correct mutual positioning is obtained. In doing so, each single heat transfer element of, where appropriate, very many provided heat transfer elements is individually rotated in correspondence with the rotational position of the stationary preform in front of it. In terms of process engineering this can be realized by simple measures and permits a high production rate with little refuse because the heat transfer element can be rotated very fast and precisely controlled without damaging the preform.

As the heat transfer element and the holder positioning the heat transfer element relative to the preform are arranged in the device to be rotatable about a heat transfer element axis and are coupled with a rotational drive, the heat transfer element with the holder can be rotated into the position that is required to produce the temperature profile on the preform for the blow molding process, without needing to rotate the preform.

This reliably precludes damages to the preforms even at high production rates, and a great positioning accuracy can be obtained. Only one rotational drive is necessary, which is also capable of adjusting the correct blow molding transfer position of the preform.

According to the method the holder and the heat transfer element are commonly rotated prior to the production of the temperature profile about the heat transfer element axis into a rotational position, in which the rotational positions of a counter-marking on the heat transfer element or on the holder and a circumferential marking of the preform coincide. The circumferential marking of the preform may be used to produce the temperature profile in exact correspondence with the circumferential position of the circumferential marking so that during the subsequent blow molding process the non-circular container contour is positioned exactly in relation to the circumferential marking of the preform which, if necessary, may then be maintained on the container for other purposes.

Moreover, the preform is usefully rotated by the holder about the heat transfer element axis into a predetermined blow molding transfer position of its temperature profile only after or during the production of the temperature profile. In this production phase prior to the actual blow molding process there is enough time to properly control this rotational movement and let it take place at a moderate speed. The blow molding transfer position is here adjusted in such a way that, despite a continued rotation being homogeneous for all transferred preforms, which is generated by a transport device, each preform is transferred to the blow mold with its correctly positioned temperature profile needed for the molding process.

The heat transfer element and/or the holder can be rotated continuously or in steps.

Furthermore, the temperature profile is usefully produced by means of at least one, preferably separately cooled cooling jaw, which contacts the uniformly pretempered preform, and, after the production of the temperature profile, i.e. after a predetermined exposure time, the cooling jaw is shifted relative to the holder and to the preform into a passive position in order to avoid falsifying the temperature profile and allow the additional manipulations to the preform without time pressure, e.g. for being capable of rotating it into a correct transfer position for the blow molding process.

In a useful embodiment of the device the heat transfer element comprises at least one cooling jaw, preferably even two diametrically opposite, separately cooled cooling jaws.

The cooling jaw produces by the abstraction of heat a locally exactly defined low temperature range on the circumference of the preform, wherein the temperature profile can be adjusted exactly to the requirements with respect to the material distribution in the subsequent blow molding process. Two diametrically opposite cooling jaws are useful, for instance, for blow molding containers having an oval or rectangular contour. Even at a high production rate the separate cooling of the cooling jaws ensures that the cooling jaws abstract an exactly defined amount of heat during the respectively predetermined time of contact. Alternatively it would be possible to employ a separately heated heating jaw as heat transfer element, which locally introduces additional heat into the preform that overlays the heat introduced during a uniform pretempering. For cold preforms the heating jaws would have to be designed in correspondence with the desired temperature profile and would have to be placed around the entire preform.

In a useful embodiment the holder and the at least one cooling jaw sits on a common carrier, which is rotatable about the heat transfer element axis or the axis of the holder and is connected to the rotational drive.

In a constructionally simple and functionally reliable manner the carrier is assigned a clamping movement controller acting on both the cooling jaw and the holder while being stationary with respect to the heat transfer element axis. In this way, the necessary relative movements between the preform and the holder, on the one hand, and the preform and the cooling jaw, on the other hand, can be controlled sensitively. The clamping movement controller should be adapted to always act homogeneously, regardless of the relative rotational position of the carrier.

In a constructionally simple manner, and in order to obtain a uniform contact pressure regardless of manufacturing tolerances of the surface of the preform, the cooling jaw is disposed relatively movably, preferably in a spring-loaded manner, on a lever shiftable on the carrier by means of the clamping movement controller, which can also carry a pivot bearing of a pivot arm of the holder, wherein the pivot arm is acted on by a spring against the cooling jaw. Preferably, the clamping movement controller can be a cam control with a link sleeve shiftable parallel to the heat transfer element axis so as to always ensure the same effect regardless of the relative rotational position of the carrier. The spring action on the cooling jaw and the spring action on the pivot arm of the holder ensure a gentle action on the preform, whereby it is particularly useful to provide a common clamping movement controller for the holder and the cooling jaw to carry out the necessary clamping movements of the cooling jaw(s) (clamping for producing the temperature profile, pivoting away from each other into the passive position for terminating the production of the temperature profile) and the holder (for gripping and positioning the preform during the production of the temperature profile and for rotation into the blow molding transfer position). The springs also permit the handling of different preform dimensions to a limited extent resulting, for instance, from manufacturing tolerances or thermal influences. However, this does not preclude the movement of the cooling jaw and the pivot arm or the holder coordinated with separate controls, but independently of one another.

In order to cope with only short change-over times during a product change-over it may be useful to arrange the cooling jaw and/or the pivot arm and the holder on the carrier exchangeably. Alternatively, this unit could be exchanged together with the carrier.

In order to position the preform always reliably, yet gently, and simultaneously rotate it into the correct blow molding transfer position it may, moreover, be useful if the holder additionally comprises an axial clamping member for axially fixing the preform positioned in the holder, e.g. at the relatively dimensionally stable open end area, or a stable support ring provided thereat. The axial clamping member may be shiftable approximately parallel to the heat transfer element axis and, preferably, is forcibly adjusted likewise by the clamping movement controller when the same adjusts the holder for gripping the preform and when the holder is opened in order to transfer the preform ready for the blow molding process and being in the correct rotational position.

Usefully, the rotational drive in the device is not only used for rotationally positioning at least the heat transfer element, but usefully also for individually bringing the preform in the holder into a predetermined transfer position in which, after the transfer, the produced temperature profile is arranged in an exact rotational correspondence with the preform ready for the blow molding process.

The rotational drive can additionally assume the function of shifting the heat transfer element and the holder, with or without the preform, into a determined preform takeover position, which may correspond to the transfer position.

In a useful embodiment of the device for the blow molding of containers having non-circular contours several carriers are arranged in a temperature profile production rotor, each for at least one heat transfer element and the holder and rotational drives, preferably electric servomotors. The rotor is assigned a handover star wheel, which is supplied with tempered preforms from a heating station, as well as a transfer star wheel delivering each preform in the predetermined takeover position to a blow rotor. In the handover star wheel the tempered preforms are supplied in random rotational positions. The heat transfer element and the holder adjust themselves to the random rotational position of each supplied preform by a corresponding rotational movement as soon as the preform is ready for takeover. The temperature profile is produced and then brought into a specific rotational orientation, which is adjusted to the predetermined transfer position to the blow rotor. Each rotational drive may be connected to a controller controlling the rotational movements and/or the respective rotational position of the rotational drive. At least one sensor is provided, which detects the respective rotational position of each supplied preform, for instance, by means of a circumferential marking of the preform prior to or during the takeover, and reports it to the controller, which specifies the rotational direction and the extent of the rotation of the rotational movement then to be carried out individually. During or after the takeover of the preform the holder and the cooling jaws are then brought by the controller of the rotational drive from the previously adjusted takeover position into a heat transfer rotational position adapting the temperature profile to be produced to the random rotational position of the preform and, as soon as the temperature profile has be produced, are brought from this heat transfer rotational position into the transfer position in which the preform provided with the temperature profile is correctly positioned in relation to the blow molding. In other words, the random rotational position of the preform when delivered without having to subject the preform to a rotational movement is accounted for by bringing the heat transfer element and the holder from the takeover position necessary for the process flow without preform each into the heat transfer rotational position matching the random rotational position of the preform and after the production of the temperature profile with the preform into the correct transfer position. These functions require only a single rotational drive, and an individual rotational orientation needs only be performed once.

Here, it is useful if each preform is provided with a circumferential marking, preferably a groove in a support ring in the open end area, which can be detected by a sensor with respect to the random rotational position of the preform, and if the holder is provided with a projection engageable with the groove in the heat transfer rotational position. The engagement ensures that the preform does not rotate in an uncontrolled manner relative to the heat transfer element because the temperature profile would then no longer fit the blow mold. The circumferential marking of the preform may also be used in the blow mold for properly positioning the preform. Finally, it is possible to use this circumferential marking, specifically a groove, later for correctly positioning surface markings or labels or a closure of the container.

BRIEF DESCRIPTION OF THE DRAWINGS

An embodiment of the subject matter of the disclosure is explained by means of the drawing. In the drawing.

DETAILED DESCRIPTION OF THE PREFERRED EMBODIMENT

Figure 2:
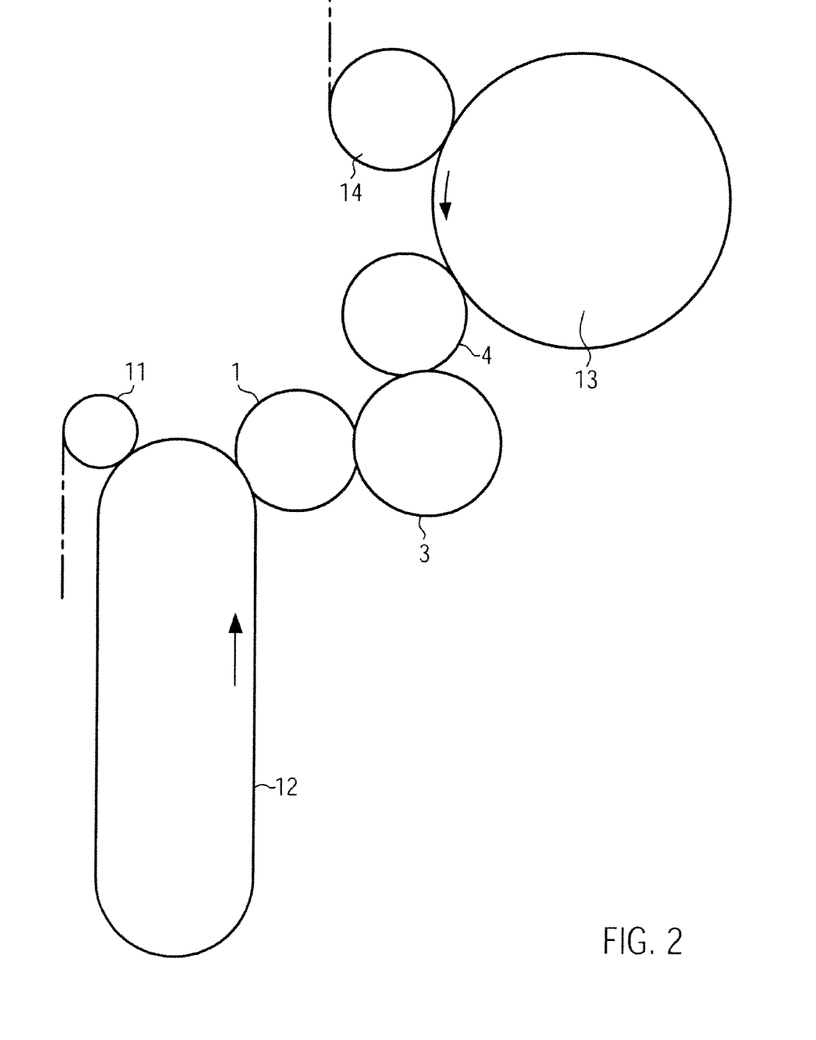
FIG. 2 shows a schematic top view of the total blow molding machine.

FIG. 2 illustrates the non-limiting exemplary realization of a blow molding machine, e.g. for manufacturing (blow molding or stretch blow molding) containers having a non-circular cross-section from preforms of a thermoplastic material, typically plastic containers for washing gels, cosmetics, cleaning agents and the like. A delivery star wheel 11 delivers non-illustrated preforms to a heating module 12. The preforms are uniformly tempered in the heating module 12, preferably subject to permanent rotation, and are then transferred by a handover star wheel 1 to a temperature profile production rotor 3. A transfer star wheel 4 transfers the preforms provided with the temperature profile from rotor 3 to a blow rotor 13 which shapes the containers, which are eventually removed by an outfeed star wheel 14 for further processing.

Figure 1:
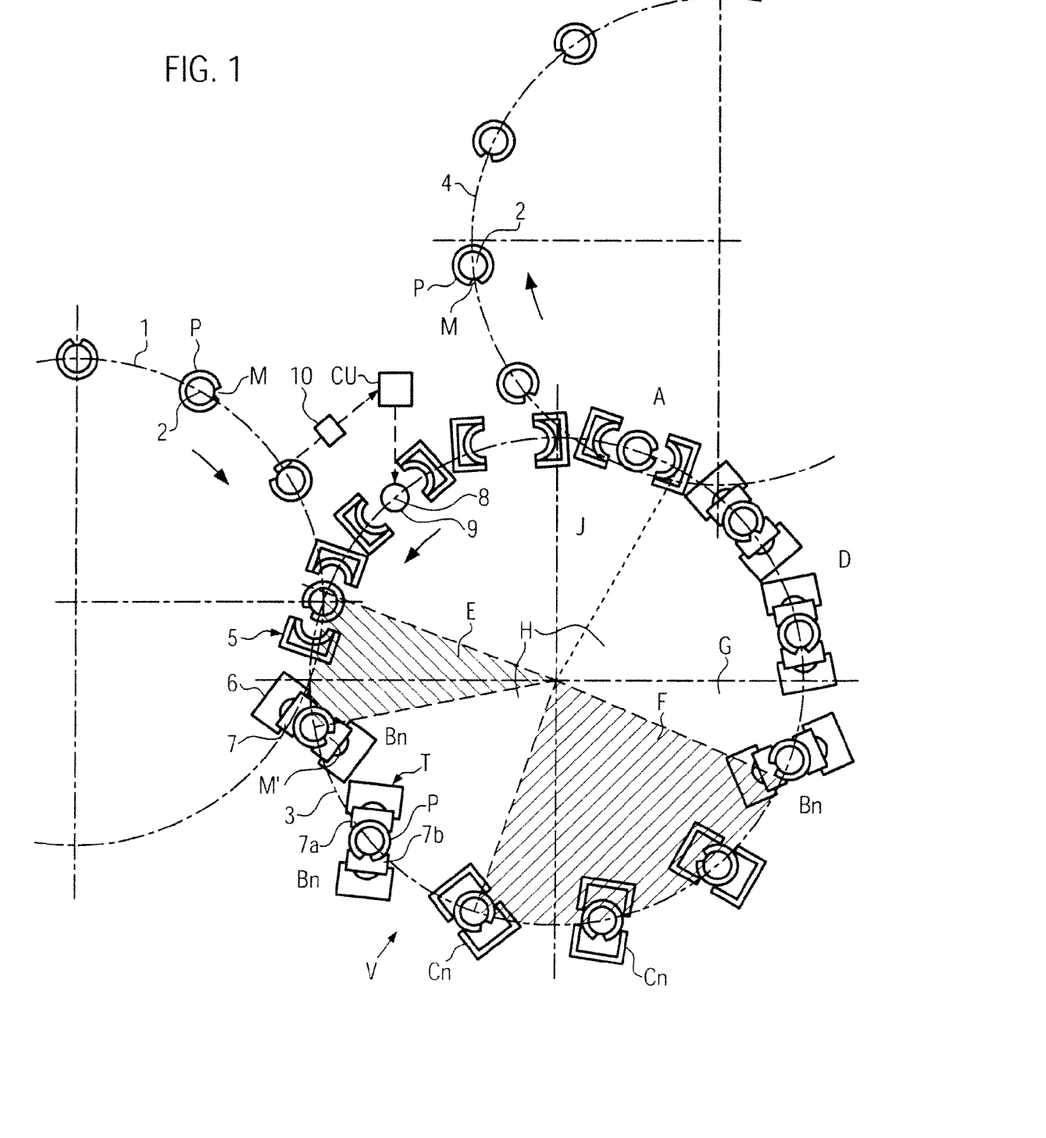
FIG. 1 shows a schematic top view of a portion of a container blow molding machine.

FIG. 1 shows a portion of the handover star wheel 1, the rotor 3 and the transfer star wheel 4. The preforms P of a thermoplastic material are supplied by handover star wheel 1 in random rotational positions. For instance, each preform P has a circumferential marking M offset with respect to its center 2, wherein the circumferential marking M represents the random rotational position of the preform P in the handover star wheel 1 such that it can be sensed.

The handover star wheel 1 is assigned, for instance, at least one sensor 10 sensing the respective random rotational position of each preform P in a non-contact manner and reporting it to a controller CU which is in a control connection with each of a plurality of rotational drives 9 distributed in the rotor 3 at regular circumferential spacings. In an alternative embodiment the preforms P in the handover star wheel may also already be supplied in identical relative rotational positions.

From the rotor 3 the preforms P provided with the temperature profile are transferred in identical transfer positions adjusted to the blow rotor 13 to the transfer star wheel 4. To produce the temperature profile in exact correspondence with the circumferential marking M the rotational drives 9 are connected to respectively associated heat transfer elements T and holders 7 for fixing and positioning the respective preform P in such a way that the heat transfer elements T and the holders 7 are rotationally shiftable relative to the preforms prior to the takeover, for instance, about heat transfer element axes 8 in rotor 3, namely according to control commands transmitted by the controller CU, which comply with the respective signals of the at least one sensor 10, and proceeding from a predetermined and previously adjusted takeover position on the rotor 3.

In the embodiment shown each of herein provided two heat transfer elements T is a cooling jaw 6, and each holder 7 is composed of two pieces with holding members 7a, 7b. In addition to the rotational movement controllable by the rotational drive 9 the heat transfer elements T and the cooling jaws 6 as well as the holding members 7a, 7b are generally movable transversely to the heat transfer element axis 8, as will be explained below.

The rotor 3 is shown to have different sectors E, H, F, G and J within a 360° rotation, which sectors correspond to different process phases. Sector E starts at a preform takeover position from handover star wheel 1, in which the heat transfer elements T and the holding members 7a, 7b are in an opened takeover position A and are oriented approximately tangentially to the circumference of the rotor 3. Here, the heat transfer elements T and the holder 7 are rotated by the rotational drive 9 about the heat transfer element axis 8 relative to the random rotational position of the preform P until the circumferential marking M on the preform P coincides with a counter-marking M' of the holder 7. At the end of sector E the holding members 7a, 7b will be brought together so as to grip the preform P, which had until then been held non-rotatably in the handover star wheel 1, and remove it from handover star wheel 1 afterwards in sector H. In subsequent sector H no rotation about the heat transfer element axis 8 is performed, as appropriate, but in the random rotational position Bn the heat transfer elements T, i.e. the cooling jaws 6, are shifted toward one another until they nearly or entirely contact predetermined parts of the surface of preform P in the rotational direction toward marking M. This process is concluded at the beginning of the subsequent sector F.

In sector F the contact, or the near contact, is maintained, and the desired temperature profile is produced in correspondence with the circumferential marking M, whereby no further rotation is performed about the heat transfer element axis 8. At the end of sector F the heat transfer elements T and the cooling jaws 6 are shifted into a lifted passive position. Thus, the production of the temperature profile is concluded. However, the holder 7 continues to retain the preform P. In subsequent sector G another rotation about the heat transfer element axis 8 is performed from the random rotational position Bn into the rotational position D, i.e. to a, for instance, tangential orientation also of marking M. At the beginning of sector J the holding members 7a, 7b are spread apart when non-illustrated gripping means of transfer star wheel 4 have completely taken over the preform P until the end of sector J, so that the holding members 7a, 8b and the heat transfer elements T are ready for a new preform P. In sector G the rotation is performed in such a way that, for instance, the circumferential marking M is positioned at the rear end in the direction of movement, so that all preforms P are transported in transfer star wheel 4 in the same transfer position in which the produced temperature profile is positioned correctly with respect to the constructional conditions in a blow mold of the blow rotor 3.

Figure 3:
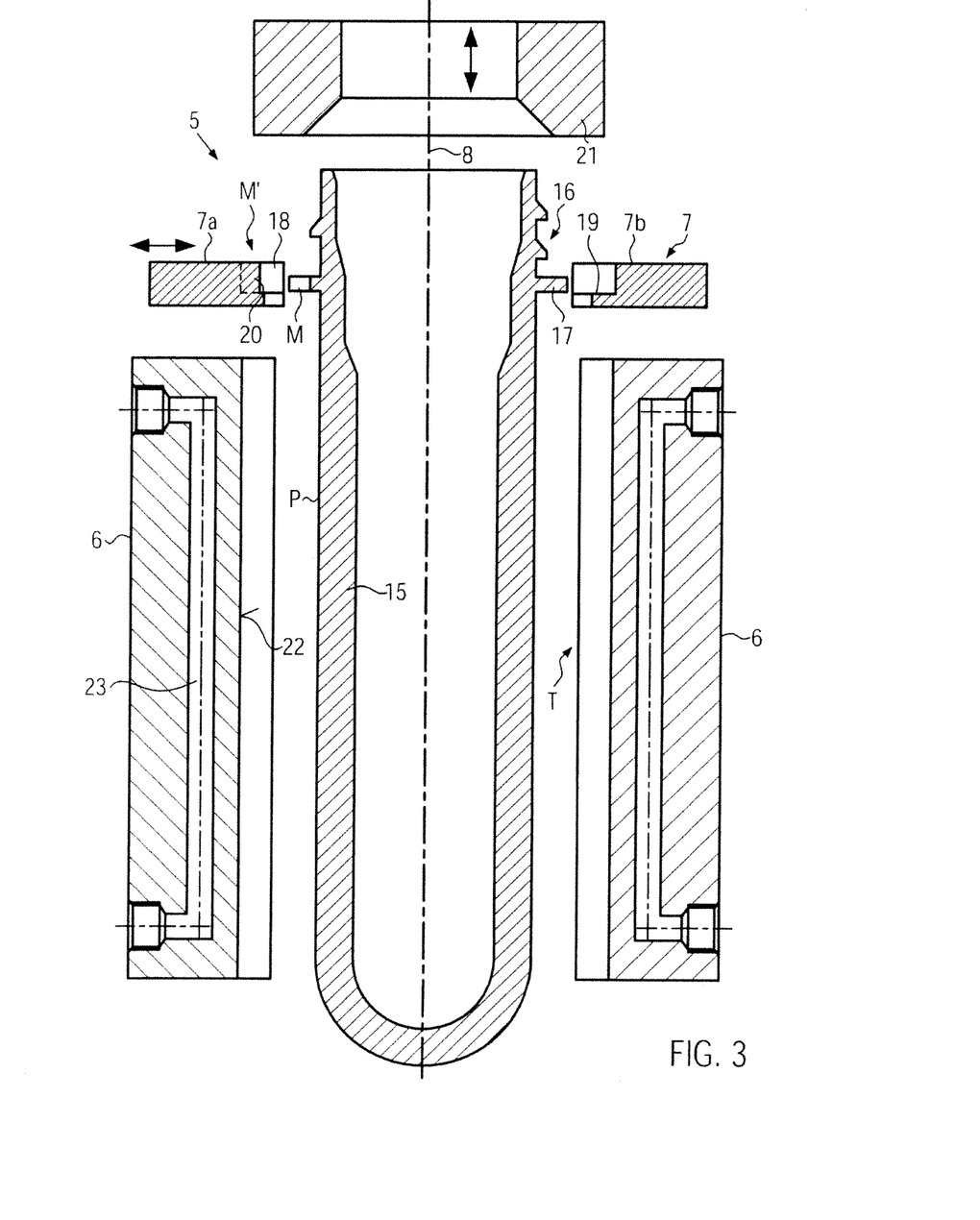
FIG. 3 shows a sectional view of associated components, producing a temperature profile in a preform.

FIG. 3 illustrates in an exploded view components used during the production of the temperature profile in the preform P. The preform P has a body 15 with a thicker wall and an open end area 16 already with its final shape (e.g. including a thread or a holding flange for crown caps, or slip-on connecting elements) and, for example, a support ring 17 in which the circumferential marking M is provided in form of a groove. The open end area 16 does not require a temperature profile because it is substantially no longer formed during the blow molding process. Each holding member 7a, 7b of the holder 7 has a recess 18 which is open on the upper side, a bearing edge 19 defined approximately in correspondence with the circumferential shape of the support ring 17. For instance, in holding member 7a the counter-marking M' is shaped as a projection 20, which can be engaged with the circumferential marking M, i.e. the groove in the support ring 17, when the holding members 7a, 7b are brought more closely to one another than is shown in FIG. 3, in the direction of the double arrow. Each cooling jaw 6 is provided, for instance, with a separate cooling 23 and comprises at least one contact surface 22 which is curved in correspondence with the substantially circular cylindrical circumferential shape of the body 15 of the preform P.

The contour of the contact surface 22 is optional and depends, inter alia, on the contour of the desired temperature profile. Furthermore, an axial clamping member 21 pertaining to the holder 7 is optionally provided, which can be shifted in the direction of the double arrow and approximately parallel to the heat transfer element axis 8 so as to fix the open end area 16 of the preform P on the bearing edges 19 and avoid undesired heat losses from the open end area 16.

Figure 4:
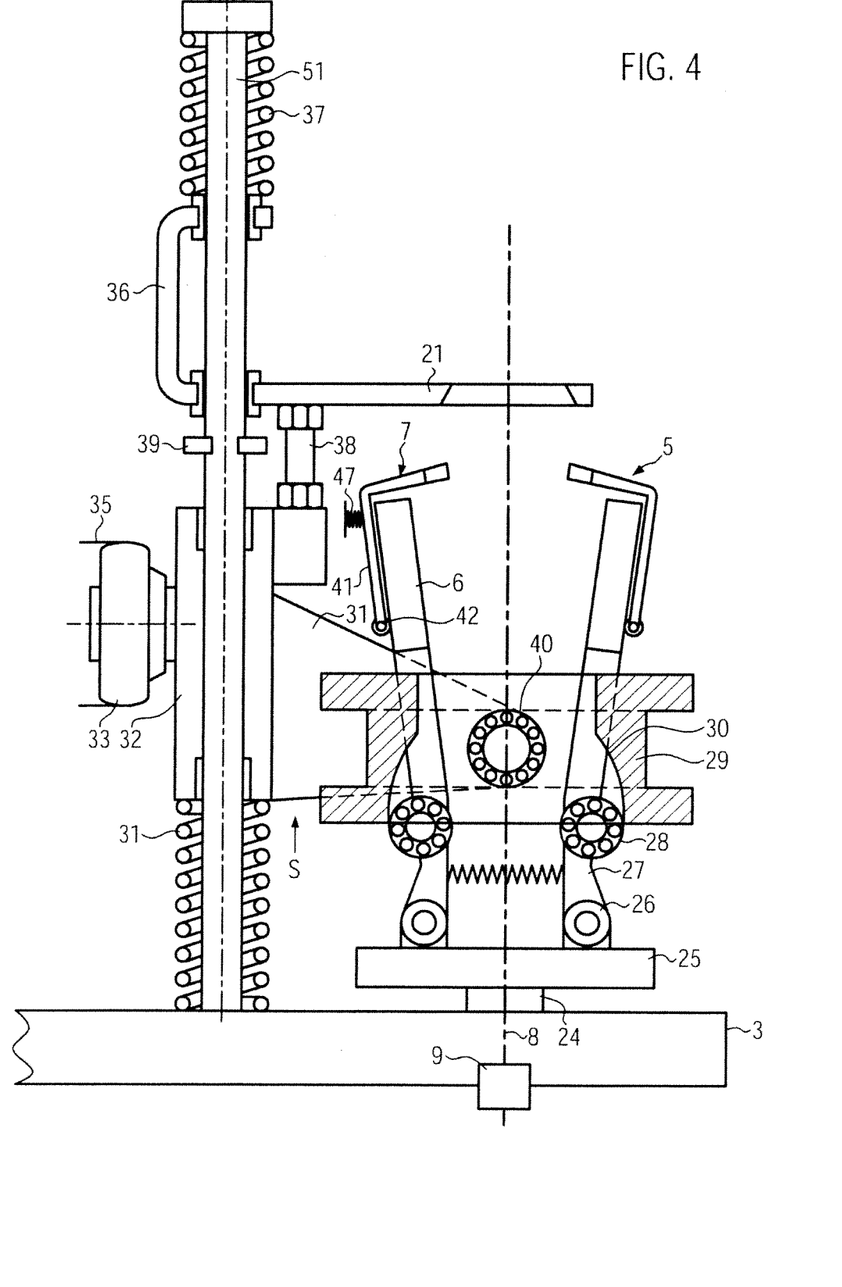
FIG. 4 shows a partial sectional view of a section of a temperature profile production rotor of the blow molding machine in a particular operating position.
Figure 5:
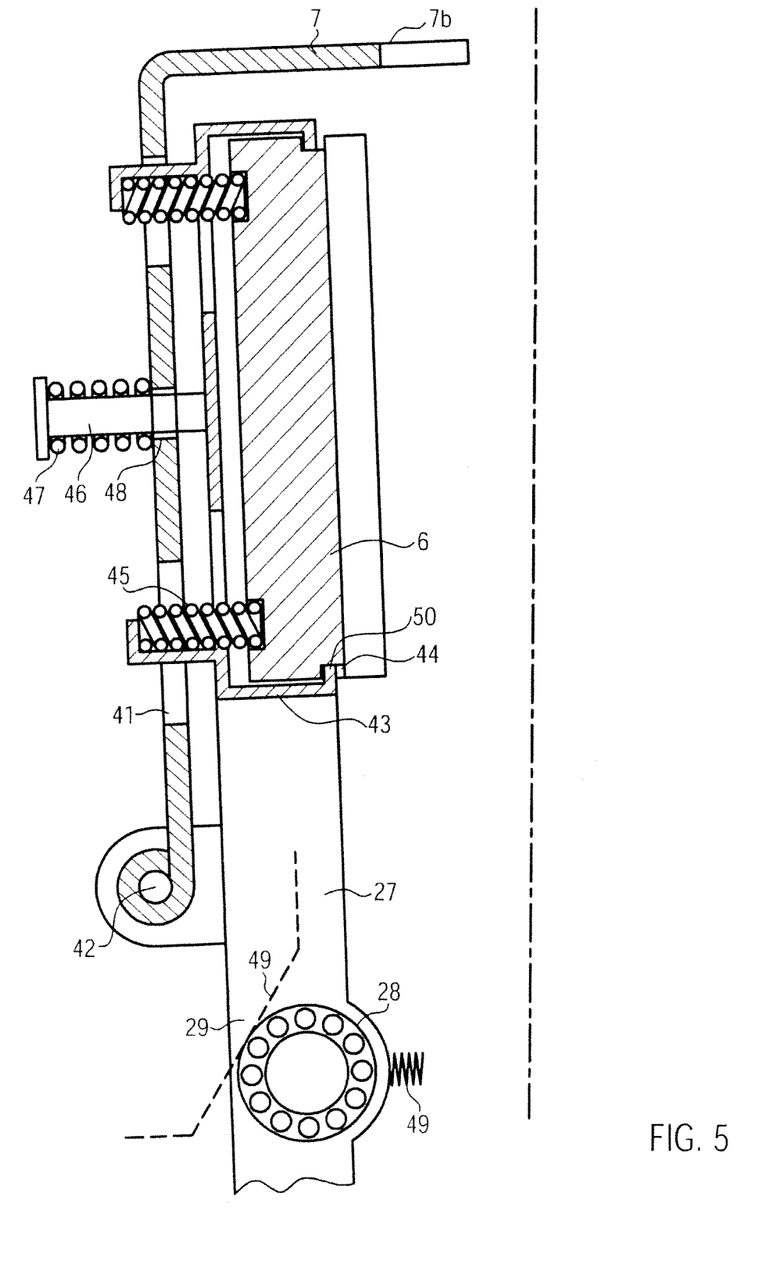
FIG. 5 shows an enlarged detail of FIG. 4.

FIGS. 4 and 5 depict a lateral view of details of the component groups provided on the rotor 3 for producing the temperature profile.

In rotor 3 a shaft 24 of, for instance, a disc-shaped carrier 25 is rotatably mounted and connected to the rotational drive 9, e.g. an electric servomotor, and rotatable about the axis 8. A column 51 is mounted on the rotor 3 in a stationary manner, laterally offset from the axis 8. Disposed on the carrier 25 are pivot bearings 26 of two levers 27, which carry thrust bearings 28 interacting with a rotationally symmetrical curved track 30 of a link sleeve 29. The link sleeve 29 is arranged on a console 31, which can be displaced on column 51 by a guide sleeve 32 against the force of a spring 34. A sensing wheel 33 is arranged on the guide sleeve 32, which interacts with a schematically illustrated curved track 35 of a clamping movement controller S. Above the guide sleeve 32 a bracket 36 carrying the axial clamping member 21 can be displaced on column 51 against the force of a spring 37 and placed against a stop 38 on the guide sleeve 32. The displacing stroke of the bracket 36 is limited by a stop 39 on column 51. On each lever 27 a cooling jaw 6 is arranged, as well as a pivot bearing 42 for a pivot aim 41 of the holder. The pivot arm 41 is acted on by a spring 47 in the direction of the cooling jaw 6. By upwardly and downwardly shifting the guide sleeve 32 the levers 27 are pivoted in the same direction against or under the force of an opening spring 49 so as to take over a preform P not shown in FIG. 4, position it by means of the holder and the axial clamping member 21, 7, produce the temperature profile, bring the cooling jaws 8 into the passive position, open the holder 7 and lift again the axial clamping member 21. The unit: carrier 25, levers 27 etc. may furthermore perform rotational movements about axis 8 under the control of the rotational drive 9.

According to FIG. 5 each cooling jaw 6 is arranged in a dish-shaped receptacle 43 on the lever 27, which engages with stops 50 in stroke limiting recesses 44 of the cooling jaw 6. The cooling jaw 6 is acted on, for instance, by compression springs 45 supported in the receptacle 43 to the right in FIG. 5 and has a predetermined movement allowance in the receptacle 43. The pivot arm 41 has recesses for the passage of a part of the receptacle 43 there through and carries the holding member 7b of holder 7 at the free end. In a bottom section of receptacle 43 a guide pin 46 is fixed which penetrates through an opening 48 of the pivot arm 41 and carries the spring 47 acting on the pivot arm 41 in the pivot direction clockwise about the pivot bearing 42. As the pivoting movements of each lever 27 are controlled by the displacement of the guide sleeve 32 the axial clamping member 21 in FIG. 4, too, follows these movements so as to cover the open end area 16 of the preform P of FIG. 3 when the holding members 7a, 7b have been pivoted toward one another, and clamp the supporting collar 17 to the bearing edges 19.

In left sector H in FIG. 1 initially the holding members 7a, 7b are positioned toward each other only to such an extent that the preform P is sufficiently positioned. Only as of the beginning of sector F in FIG. 1 are the holding members 7a, 7b shifted inwardly by further pivoting the levers 27 until the cooling jaws 6 rest with their contact surfaces 22 against the preform P or are closely opposite the same, so that a heat transfer from body 15 to the cooling jaw 6 can take place. In contact with the preform P the cooling jaw 6 may slightly yield to the springs 45 so as to exactly bear against it and compensate manufacturing tolerances.

As soon as the cooling jaws 6 are detached from the preform P by pivoting the levers 27 outwardly at the beginning of sector G in FIG. 1 the pivot arms 41 are acted on by the springs 47 allowing the holding members 7a, 7b to further position the preform P. The cooling jaws 6 are then in the passive position farther away from the preform P, but not yet in the completely opened position, for instance, according to FIG. 4. Only as of the beginning of sector J in FIG. 1 are the holding members 7a, 7b too moved apart by further pivoting the levers 27 apart in order to allow the preform P provided with the desired temperature profile to be taken over by the transfer star wheel 4 in the transfer position.

In an alternative, non-illustrated embodiment the pivoting movements of the pivot arms 41, the movements of the cooling jaws 6 and of the axial clamping member 21 may be controlled by separate mechanisms or drives, while rotational movements are controlled by the rotational drive 9.

The invention claimed is:

1. A method for blow molding thermoplastic preforms into containers, each having a non-circular cross-section, comprising the steps of:
supplying each preform in a random rotational position from a handover star wheel to one of a plurality of holders of a temperature profile producing rotor, each holder functionally associated with a heat transfer element, wherein each preform has a circumferential marking and each holder or heat transfer element of each holder has a circumferential counter-marking;
positioning each preform within each holder by commonly rotating each holder and functionally associated heat transfer element relative to each preform about a heat transfer element axis until the circumferential counter-marking coincides with the circumferential marking and then gripping each preform by means of each holder;
advancing each gripped preform around the temperature profile producing rotor while producing a desired temperature profile varying at least along the circumference of each preform by at least one heat transfer element cooling jaw which contacts or nearly contacts each preform to transfer heat from the preform to each cooling jaw;

rotating each preform by means of each holder about the heat transfer element axis into a predetermined blow molding transfer position during or after producing said temperature profile; and transferring each tempered preform from the temperature profile producing rotor to a blow mold rotor at which each preform is blow molded into a container having a non-circular cross-section.

2. The method according to claim 1, which further comprises shifting each cooling jaw into a passive position relative to each preform and holder after producing the desired temperature profile.

3. The method according to claim 1, wherein each heat transfer element comprises two diametrically opposed cooling jaws.

4. The method according to claim 1, wherein each cooling jaw is separately cooled.

5. The method according to claim 1, wherein each holder and functionally associated heat transfer element are coupled to a rotary drive in the temperature profile producing rotor.

6. The method according to claim 5, which further comprises:
sensing the random rotational position of each circumferential marking prior to supplying each preform from the handover star wheel to a holder: and
using a controller operating the rotary drive to control a common rotational movement of each holder and functionally associated heat transfer element about the heat transfer element axis until the circumferential countermarking coincides with the circumferential marking.

7. The method according to claim 1, wherein said transferring is by a transfer star wheel.

8. The method according to claim 5, wherein the transfer star wheel transfers each preform in the predetermined blow molding transfer position.

* * * * *